US009290959B1

(12) United States Patent  
Tadros et al.

(10) Patent No.: US 9,290,959 B1
(45) Date of Patent: Mar. 22, 2016

(54) SITE-CAST COUPLED PRESTRESSED CONCRETE WIND TOWER

(71) Applicant: e.Construct.USA, LLC, Omaha, NE (US)

(72) Inventors: Maher K. Tadros, Omaha, NE (US); Chuanbing Sun, Omaha, NE (US)

(73) Assignee: e.Construct.USA, LLC, Omaha, NE (US)

( * ) Notice: Subject to any disclaimer, the term of this patent is extended or adjusted under 35 U.S.C. 154(b) by 9 days.

(21) Appl. No.: 14/656,572

(22) Filed: Mar. 12, 2015

Related U.S. Application Data

(60) Provisional application No. 61/952,030, filed on Mar. 12, 2014, provisional application No. 61/973,661, filed on Apr. 1, 2014.

(51) Int. Cl.
*E04H 12/00* (2006.01)
*E04H 12/12* (2006.01)
*E04H 12/16* (2006.01)
*E04H 12/34* (2006.01)
*F03D 11/04* (2006.01)

(52) U.S. Cl.
CPC ............... *E04H 12/12* (2013.01); *E04H 12/16* (2013.01); *E04H 12/342* (2013.01); *F03D 11/04* (2013.01)

(58) Field of Classification Search
CPC ....... E04H 12/12; E04H 12/16; E04H 12/342; F03D 11/04
USPC ........ 52/40, 223.14, 223.3, 223.4, 223.5, 843
See application file for complete search history.

(56) References Cited

U.S. PATENT DOCUMENTS

| | | | |
|---|---|---|---|
| 1,131,798 A * | 3/1915 | Shoupe | 52/261 |
| 3,472,031 A * | 10/1969 | Kelso | 405/275 |
| 4,007,574 A * | 2/1977 | Riddell | 52/302.3 |
| 4,248,025 A * | 2/1981 | Kleine et al. | 52/845 |
| 4,327,703 A * | 5/1982 | Destree | 125/1 |
| 4,909,011 A * | 3/1990 | Freeman et al. | 52/648.1 |
| 5,375,353 A * | 12/1994 | Hulse | 40/217 |
| 5,396,674 A * | 3/1995 | Bolds | 5/633 |
| 8,555,600 B2 * | 10/2013 | Cortina-Cordero et al. | 52/745.18 |
| 9,016,012 B1 * | 4/2015 | Sritharan et al. | 52/223.6 |
| 9,157,251 B2 * | 10/2015 | Newman et al. | |
| 2005/0097855 A1 * | 5/2005 | Fouad et al. | 52/730.4 |
| 2009/0025304 A1 * | 1/2009 | Irniger et al. | 52/40 |
| 2009/0031639 A1 * | 2/2009 | Cortina/Cordero | 52/40 |
| 2011/0304142 A1 * | 12/2011 | Baker | 290/44 |
| 2012/0137621 A1 * | 6/2012 | Husemann et al. | 52/651.01 |
| 2014/0245671 A1 * | 9/2014 | Sritharan et al. | 52/173.1 |

* cited by examiner

*Primary Examiner* — Charles A Fox
*Assistant Examiner* — James Buckle, Jr.
(74) *Attorney, Agent, or Firm* — Suiter Swantz pc llo

(57) ABSTRACT

Methods and systems for constructing wind towers are disclosed. A wind tower may be constructed by vertically stacking and securing a plurality of modular units. Each modular unit of the plurality of modular units may include three generally hexagonal columns and three concrete panels coupled to the three generally hexagonal columns. The three concrete panels and the three generally hexagonal columns may jointly form a generally equilateral triangular prism.

18 Claims, 23 Drawing Sheets

SITE-CAST COUPLED PRESTRESSED CONCRETE WIND TOWER

CROSS-REFERENCE TO RELATED APPLICATIONS

The present application claims the benefit under 35 U.S.C. §119(e) of U.S. Provisional Application Ser. No. 61/952,030, filed Mar. 12, 2014. Said U.S. Provisional Application Ser. No. 61/952,030 is hereby incorporated by reference in its entirety.

The present application also claims the benefit under 35 U.S.C. §119(e) of U.S. Provisional Application Ser. No. 61/973,661, filed Apr. 1, 2014. Said U.S. Provisional Application Ser. No. 61/973,661 is hereby incorporated by reference in its entirety.

TECHNICAL FIELD

The present disclosure generally relates to the field of construction and more particularly to a site-cast coupled prestressed concrete wind tower.

BACKGROUND

A wind turbine is a device that converts kinetic energy from wind into electrical power. Wind turbines are typically positioned on supporting towers. Conventional techniques and methods for transporting and constructing such supporting towers are cumbersome and expensive.

SUMMARY

An embodiment of the present disclosure is directed to a tower. The tower may include a plurality of vertically stackable modular units. Each modular unit of the plurality of modular units may include three generally hexagonal columns and three concrete panels coupled to the three generally hexagonal columns, wherein the three concrete panels and the three generally hexagonal columns jointly form a generally equilateral triangular prism.

A further embodiment of the present disclosure is directed to a method. The method may include: constructing a tower by vertically stacking and securing a plurality of modular units, wherein each modular unit of the plurality of modular units includes: three generally hexagonal columns; and three concrete panels coupled to the three generally hexagonal columns, wherein the three concrete panels and the three generally hexagonal columns jointly form a generally equilateral triangular prism.

An additional embodiment of the present disclosure is directed to a modular unit for building a wind tower. The modular unit may include three generally hexagonal columns and three concrete panels coupled to the three generally hexagonal columns, wherein the three concrete panels and the three generally hexagonal columns jointly form a generally equilateral triangular prism.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
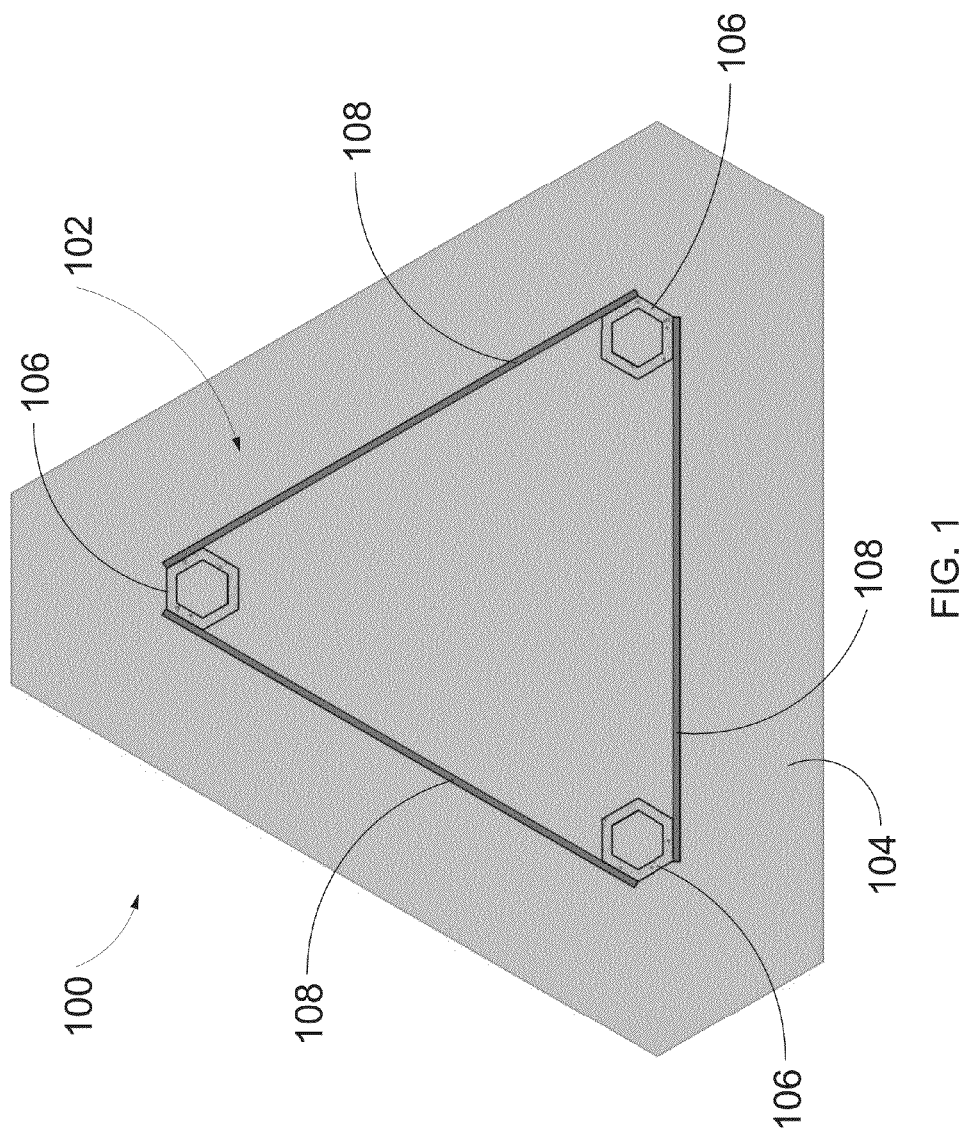
FIG. 1 is a top view of a tower constructed utilizing columns and panels in accordance with the present disclosure.
Figure 2:
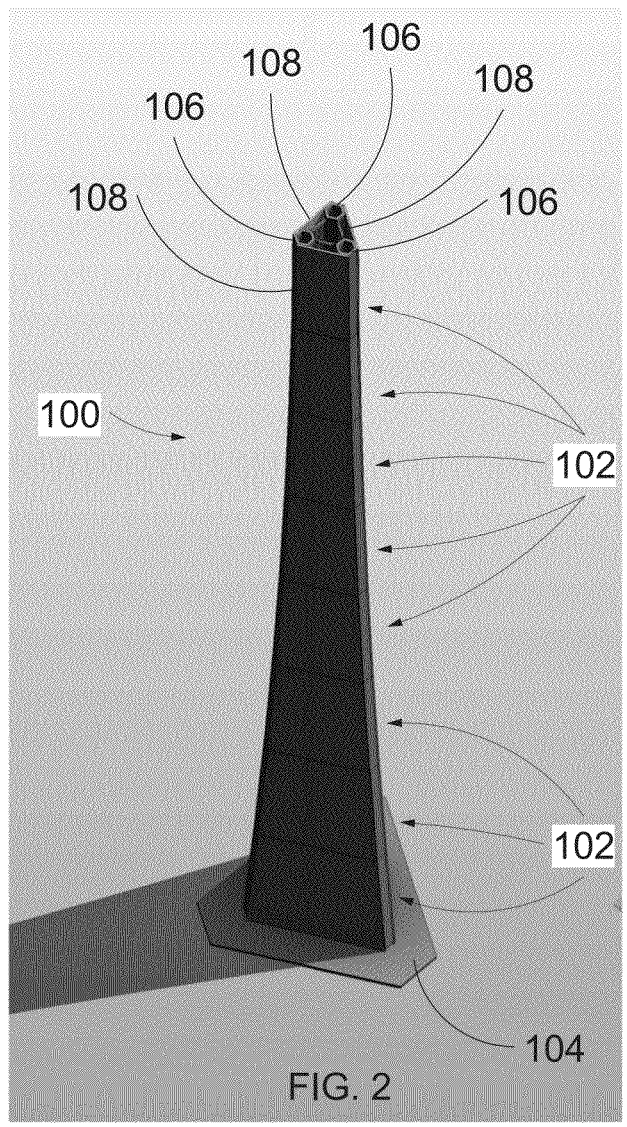
FIG. 2 is an isometric view of the tower shown in FIG. 1.
Figure 3:
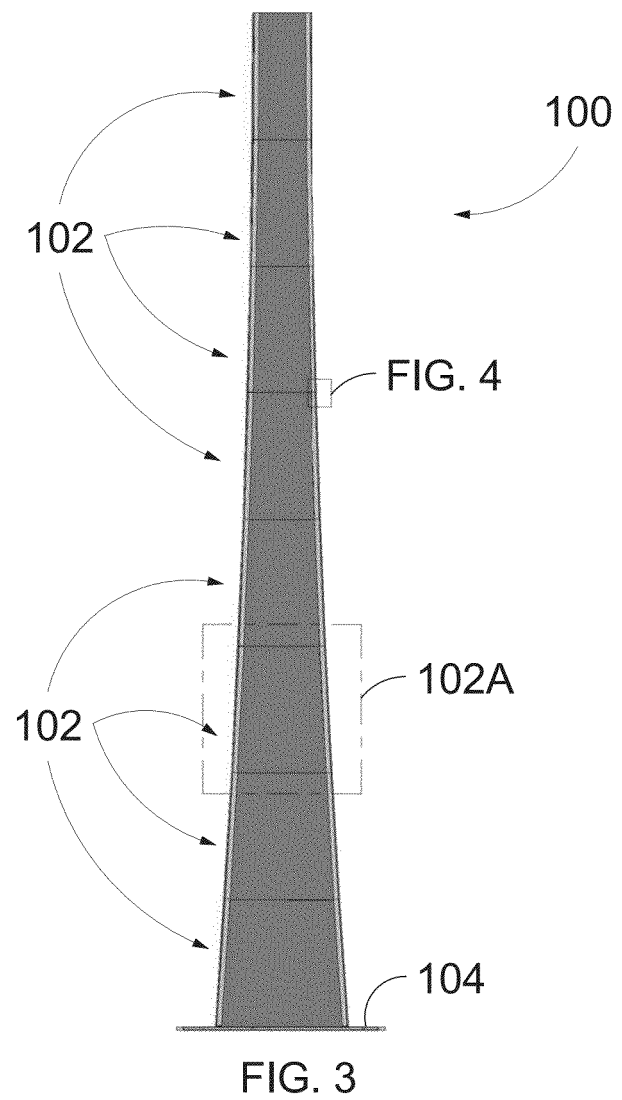
FIG. 3 is a side elevation view of the tower shown in FIG. 1.

Referring generally to FIGS. 1 through 3, an exemplary tower 100 constructed utilizing a plurality of vertically stacked modular units 102 in accordance with an embodiment of the present disclosure is shown. As shown in FIGS. 1 and 2, each modular unit 102 includes three columns 106 and three panels 108 coupled to the three columns 106, wherein the columns 106 and the panels 108 jointly form a generally equilateral triangular prism with the columns 106 positioned at the edges and the panels 108 forming the side surfaces.

It is to be understood that the term "generally" equilateral triangular prism is utilized to reflect the depictions in FIGS. 2 and 3 that, in certain embodiments, the tower 100 may slightly taper toward one end. In such embodiments, the columns 106 within a given modular unit (e.g., modular unit 102A) may lean slightly toward the center, forming a truncated equilateral triangular pyramid. It is therefore to be understood that the term "generally" equilateral triangular prism utilized herein generally refers to equilateral triangular prisms (having edges formed by three nearly or substantially parallel columns 106) as well as truncated equilateral triangular pyramids (having edges formed by three columns 106 leaning slightly toward the center). It is also to be understood that in certain embodiments, an equilateral triangular prism may have truncated corners as shown in FIG. 1.

As shown in FIGS. 1 and 2, the columns 106 may be configured to be hexagonal in shape. The hexagonal shape of the columns 106 may be advantageous and may enable a fast and secure installation process. Internally, it is contemplated that the columns 106 may be solid or hollow. For hollow columns 106, the void defined within such hollow columns 106 may form circular, hexagonal or various other shapes. It is to be understood that the thickness for the hollow section may vary depending on the desired tower height and loading applied to the tower. Typically, a minimum thickness of 12 inches may be specified for columns 106 made of concrete.

In accordance with some embodiments of the present disclosure, the columns 106 are prestressed concrete columns. Such columns 106 may be formed using pretensioning method with seven-wire Grade 270 ksi, 0.6 inch nominal diameter strands. Prestressing may be applied at the construction site using a manufacturing technique that allows the prestressing strands to be tensioned and the prestress force released to the concrete section with full end anchorage and without prestress losses due to transfer and development lengths. Special 0.7 inch diameter strands and/or higher than 270 ksi strength may be used in markets where they are available. Other types of strands may also be utilized without departing from the spirit and scope of the present disclosure.

It is contemplated that every column 106 of every modular unit 102 used to construct the tower 100 may be prestressed at the same level. In addition, these columns 106 may have the same length and geometry. In other words, identical (interchangeable) columns 106 may be utilized to form a variety of modular units 102 used to construct the tower 100. This allows for a fast and repeatable manufacturing process. In some embodiments, column length may be set to about 41 feet for a typical 328 feet tower. It is contemplated that while column length, prestressing level and wall thickness may vary, higher cost-effectiveness may be achieved by using a repeatable dimensions, reinforcement and connection details for a given class of towers.

As previously mentioned, each of the three side surfaces of the tower 100 is covered with panels 108. In some embodiments, the panels 108 are conventionally reinforced (non-prestressed) precast concrete panels, and are connected to the columns 106 behind them using connection mechanisms that allow for load transfer due to wind, seismic and other effects. The height of the panels 108 may range between about 10 and 41 feet. The width of the panels 108 may be as wide as needed to cover a given space defined between two columns 106, which may range between about 12 and 60 feet. The thickness of the panels 108 may be about 6 inches, but may also range between a 4 inch uniform plate thickness and a 24 inch ribbed plate thickness. While the panels 108 are typically of uniform thickness, however, ribs may be defined thereof to facilitate connections, improve stiffness and allow for a thinner lighter skin.

It is contemplated that the columns 106 and the panels 108 may be fabricated at the construction site of the tower 100. An appropriately prepared flat surface pallet of adequate surface area may be utilized to facilitate the fabrication process. It is noted that allowing on-site fabrication of the columns 106 and the panels 108 alleviates the need for heavy load transportation and handling, reduces costs and improves construction efficiency. It is to be understood, however, that on-site fabrication is not a requirement, and that the columns 106 and the panels 108 may be fabricated elsewhere without departing from the spirit and scope of the present disclosure.

In addition to cost reductions mentioned above, towers 100 constructed utilizing the columns 106 and the panels 108 in accordance with the present disclosure are designed to have no need for post-tensioning. Post-tensioning is a method of installation of high strength multi-strand tendons through conduits, tensioning and anchoring the tendons against the hardened concrete structure, and then injecting cementitious grout into the conduits. Utilizing the prestressed columns 106 in accordance with the present disclosure allows the relatively slow, more risky and more expensive post-tensioning process to be eliminated entirely. As will be described in details later, coupling of the prestressed columns 106 allows the prestress to be transferred end-to-end between the columns 106, rendering them continuous for the entirety of the tower 100. By eliminating the requirement for post-tensioning, the construction process is simplified and the speed of construction can be improved significantly. Furthermore, a partially erected tower (e.g., during construction) constructed in accordance with the present disclosure is very stable without any need to wait for a post-tensioning operation, grouting or welding, significantly improving safety as well.

Figure 4:
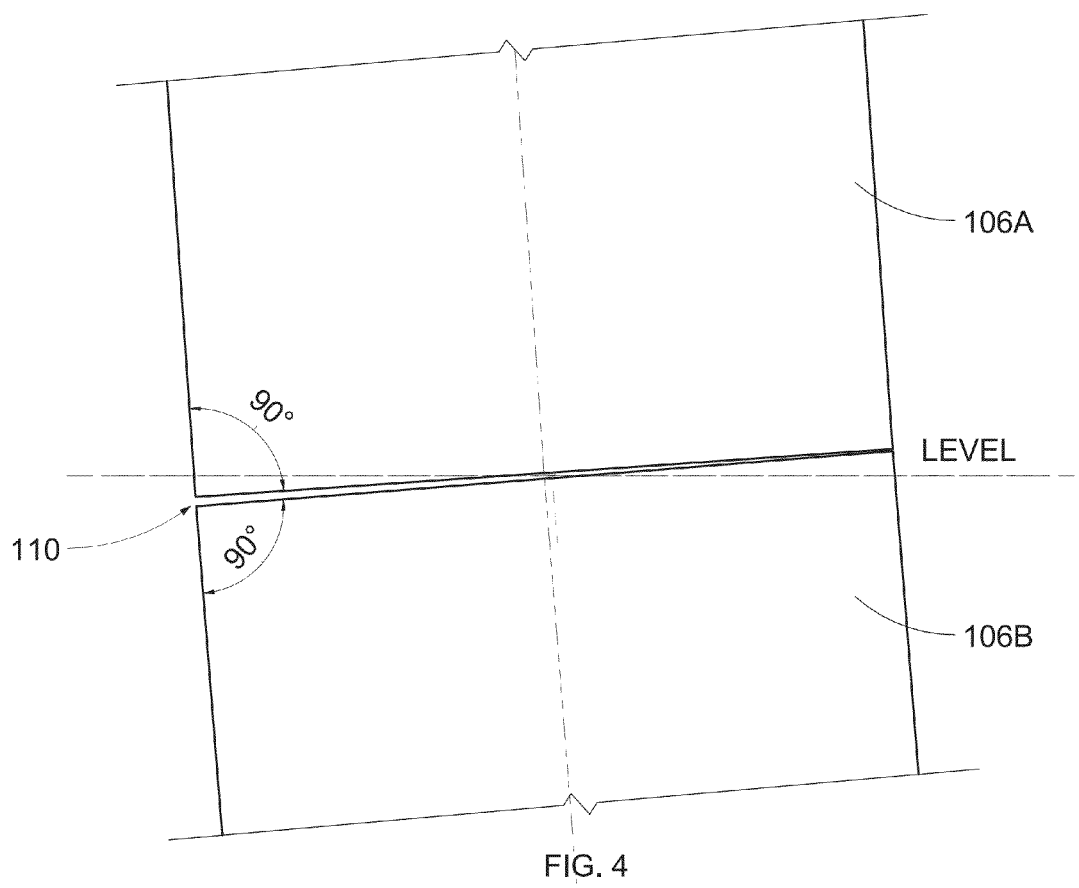
FIG. 4 is an illustration depicting a gap between two vertically stacked columns.
Figure 5:
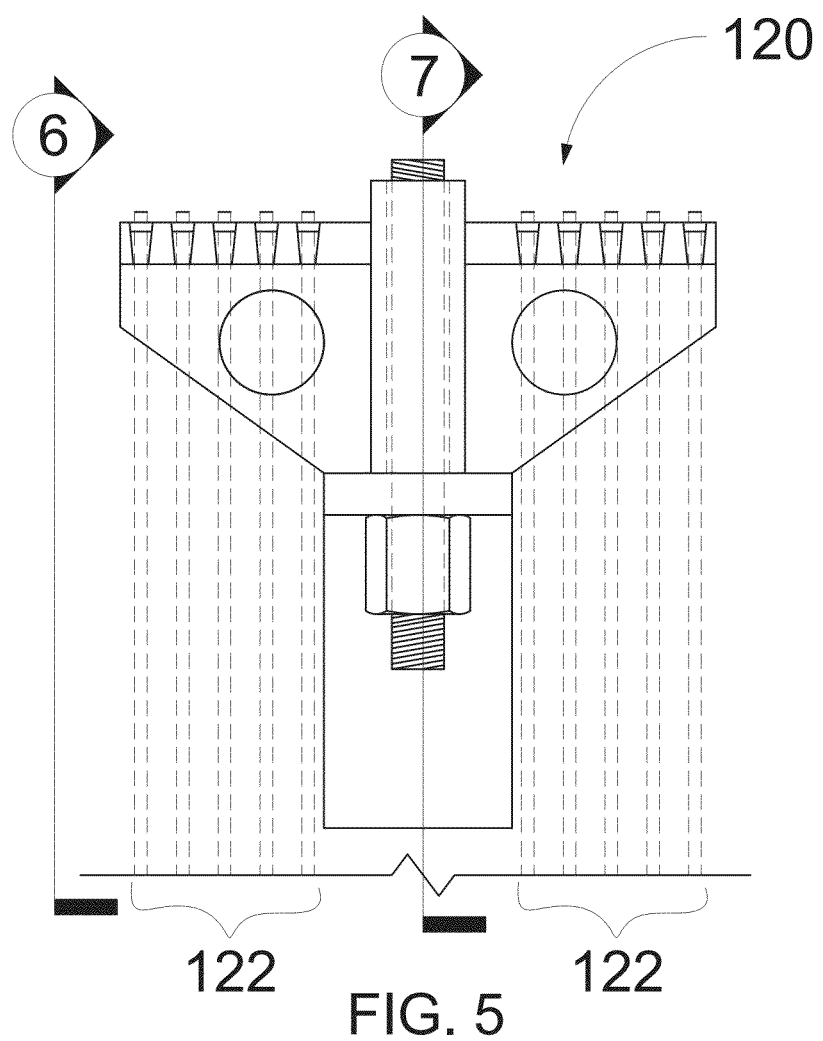
FIG. 5 is an illustration depicting a hardware assembly for placement at an end of a column.
Figure 6:
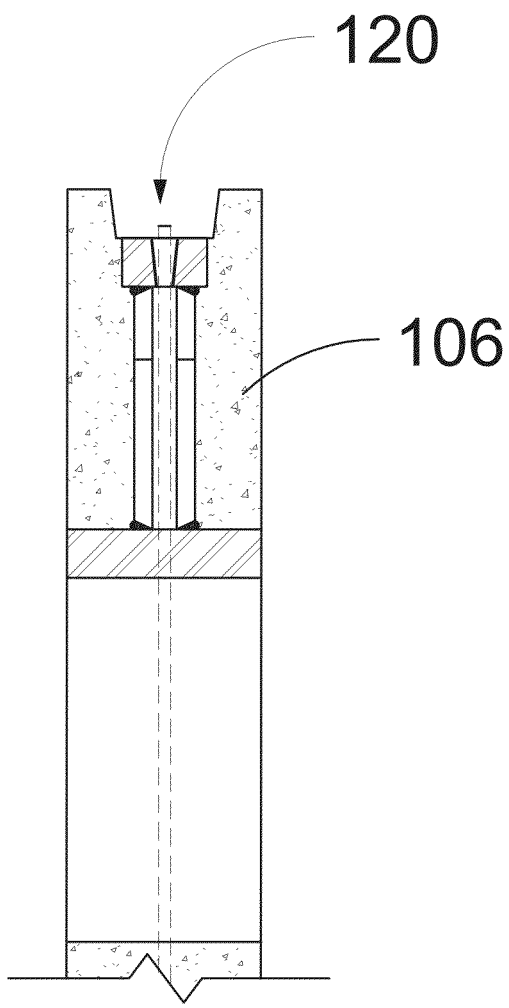
FIG. 6 is a cross-sectional view of the hardware assembly shown in FIG. 5.
Figure 7:
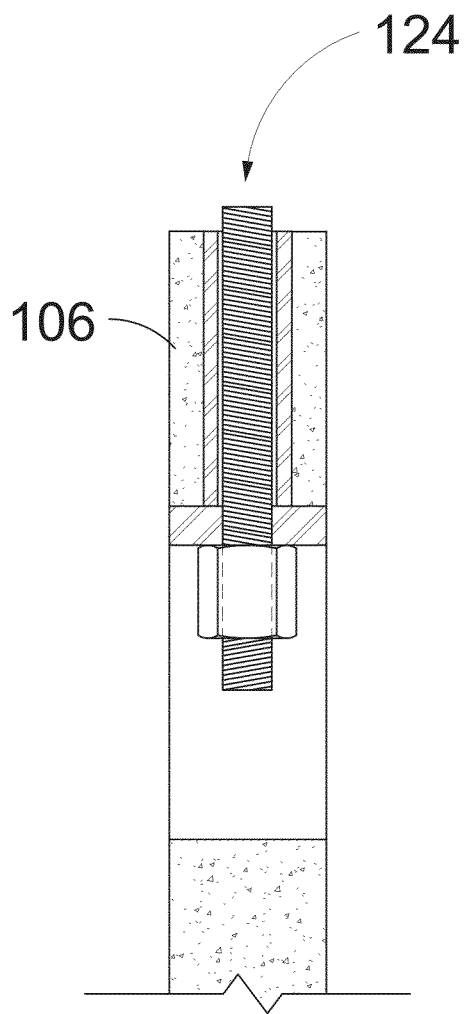
FIG. 7 is another cross-sectional of the hardware assembly shown in FIG. 5.

As previously mentioned, some towers 100 may be designed to slightly taper toward one end. Tapering may be implemented by setting a leaning angle for each column 106 uniformly, and by vertically stacking the columns 106, a straight edge having the same leaning angle can be formed. Alternatively, tapering may be implemented with an emulated curved elevation profile as depicted in FIGS. 3 and 4. To achieve such a profile, a gap 110 may form between two columns 106A and 106B, which may be filled utilizing a filler material such as plastic shims, compressible foam strips or the like. The filler material is used to secure the relative positions of the two columns 106A and 106B and to create a sealed annular space for later grouting. It is to be understood that such a gap may not be necessary for a straight surface profile.

Figure 8:
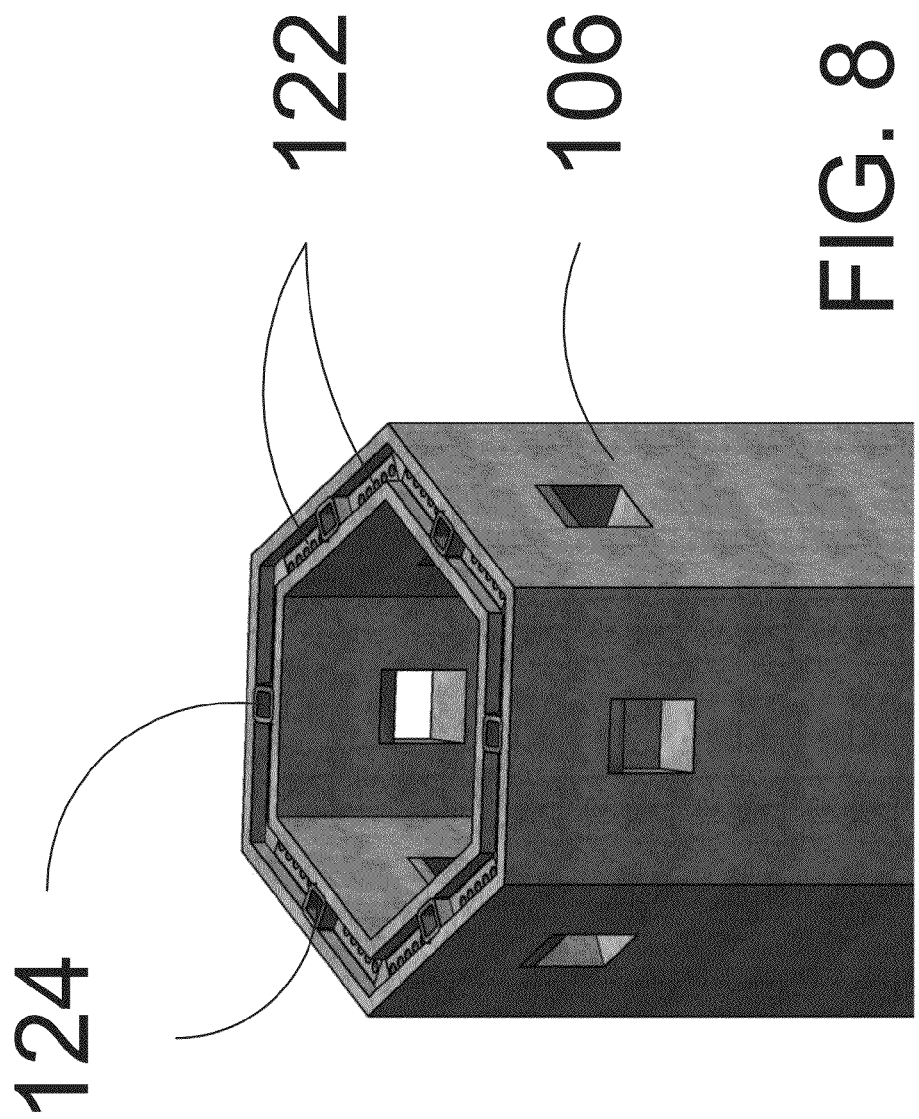
FIG. 8 is an isometric view of an end of a column, depicting placements of the hardware assemblies shown in FIG. 5.
Figure 9:
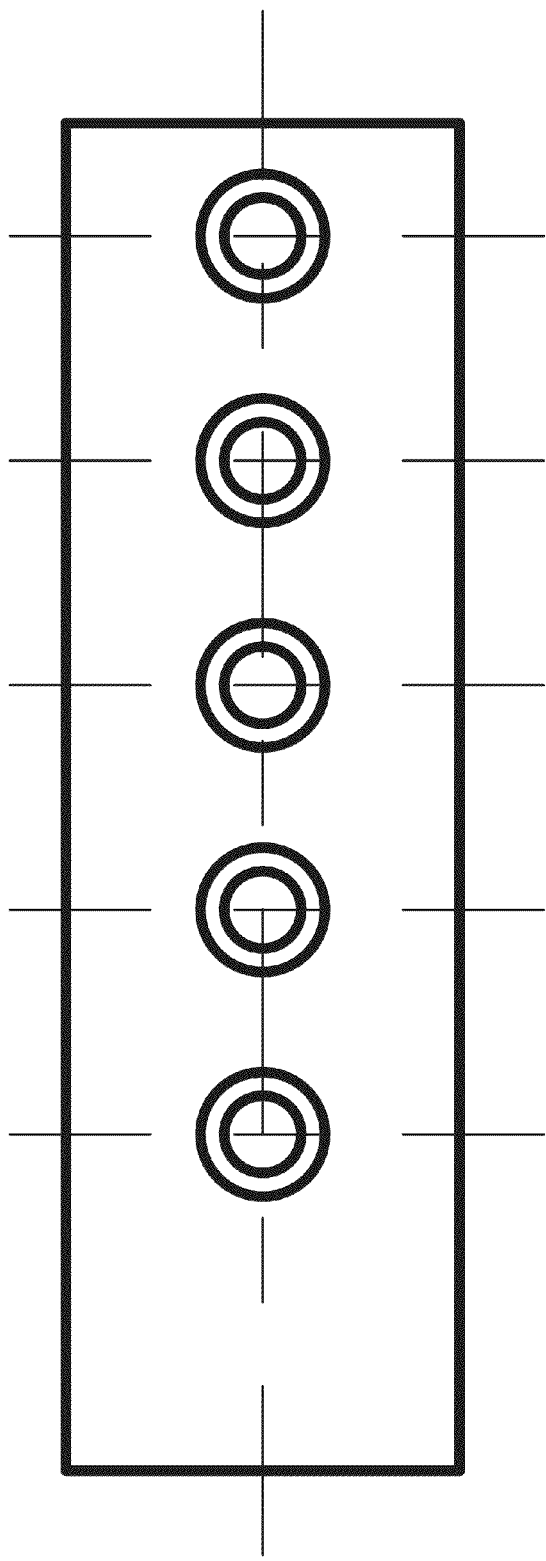
FIG. 9 is an illustration depicting an arrangement of pretensioning strands supported by a hardware assembly of FIG. 5.
Figure 10:
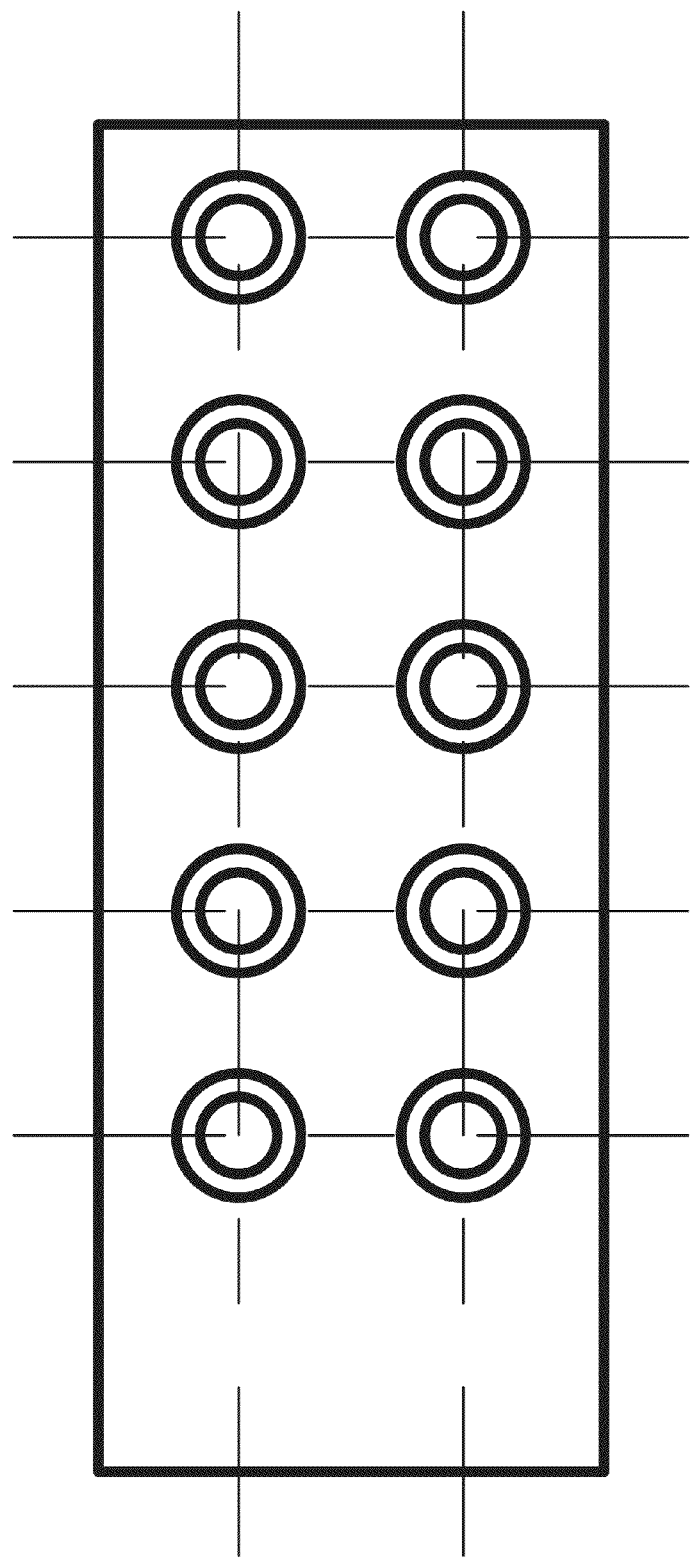
FIG. 10 is an illustration depicting another arrangement of pretensioning strands supported by a hardware assembly of FIG. 5.
Figure 11:
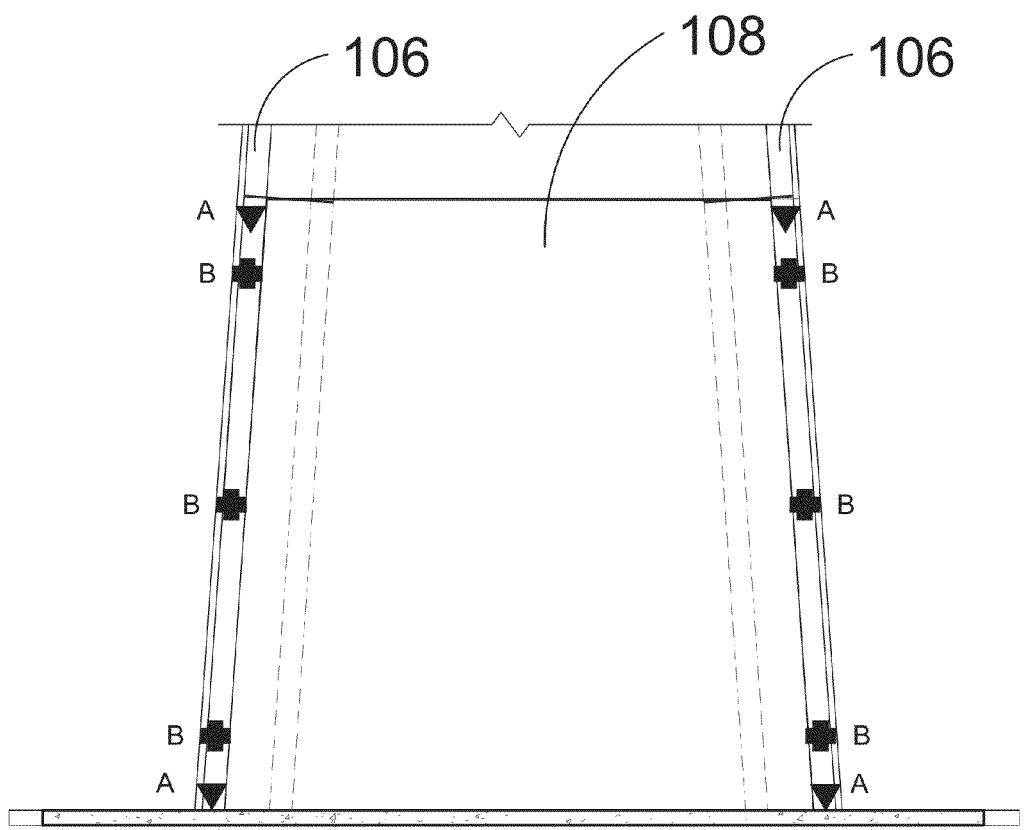
FIG. 11 is a side elevation view of a panel coupled to two columns.

Referring now to FIGS. 5 through 15, illustrations depicting exemplary configurations of various coupling mechanisms are shown. More specifically, FIGS. 5 through 10 illustrate an exemplary hardware assembly 120 that can be pre-placed in at each end of the column 106 in order to provide anchoring for the pretensioning strands 122 and to help securing coupling mechanisms 124 used for joining two vertically stacked columns. It is contemplated that for columns 106 that are hexagonal in shape, the hardware assembly 120 may be placed at the end of the column 106 on all six sides (as shown in FIG. 8). It is also contemplated that the pretensioning strands 122 may be placed in a single row (as shown in FIG. 9) or in multiple rows (as shown in FIG. 10). Placing the pretensioning strands 122 in multiple rows may help increasing the number of pretensioning strands 122 supported, which may in turn help increasing the load capacity of the column 106 when needed.

Figure 12:
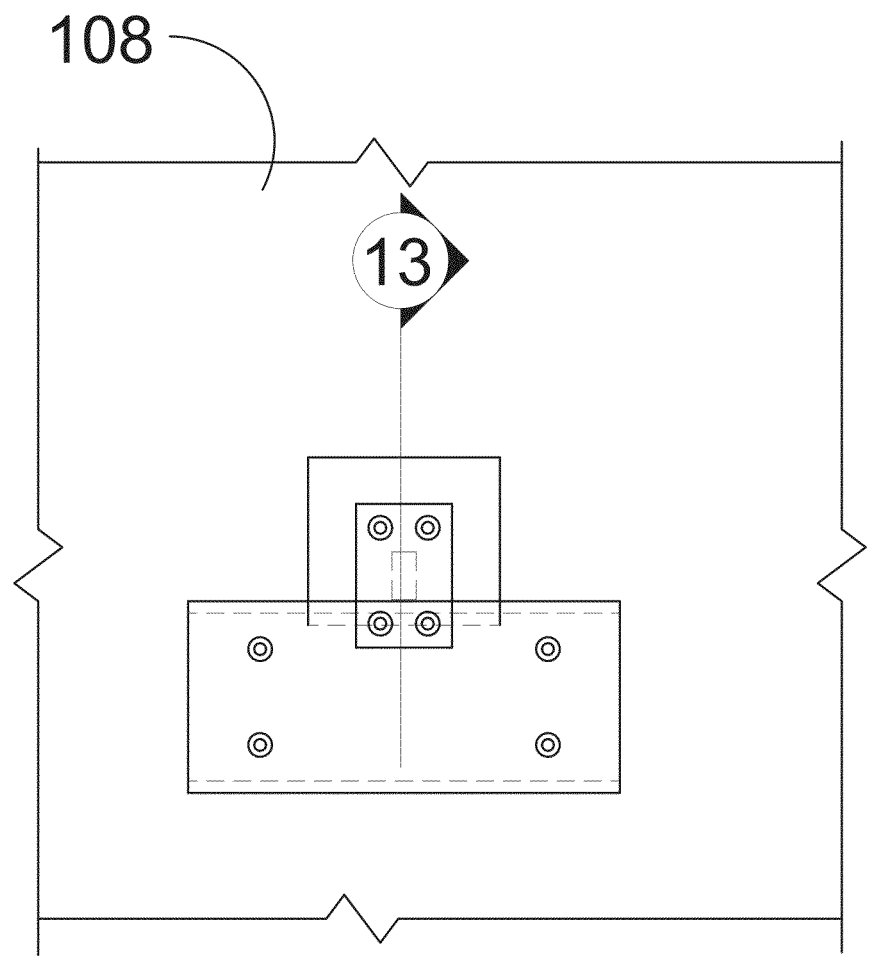
FIG. 12 is an illustration depicting a first type of coupler shown in FIG. 11.
Figure 13:
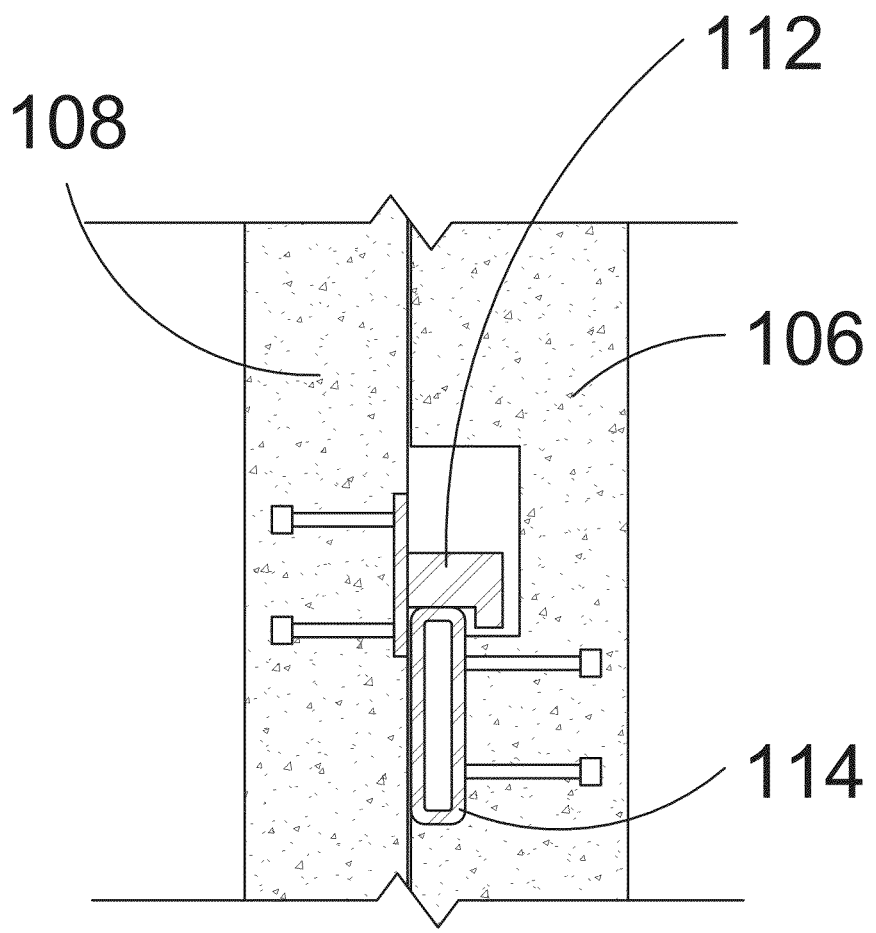
FIG. 13 is a cross-sectional view of the coupler shown in FIG. 11.
Figure 14:
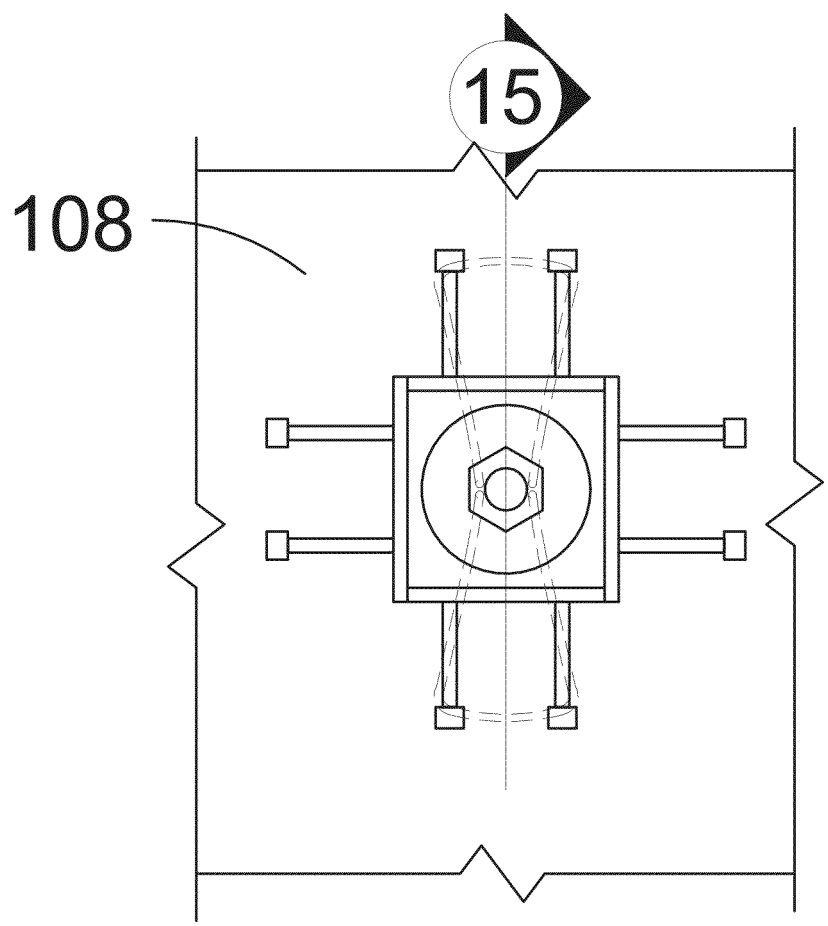
FIG. 14 is an illustration depicting a second type of coupler shown in FIG. 11.
Figure 15:
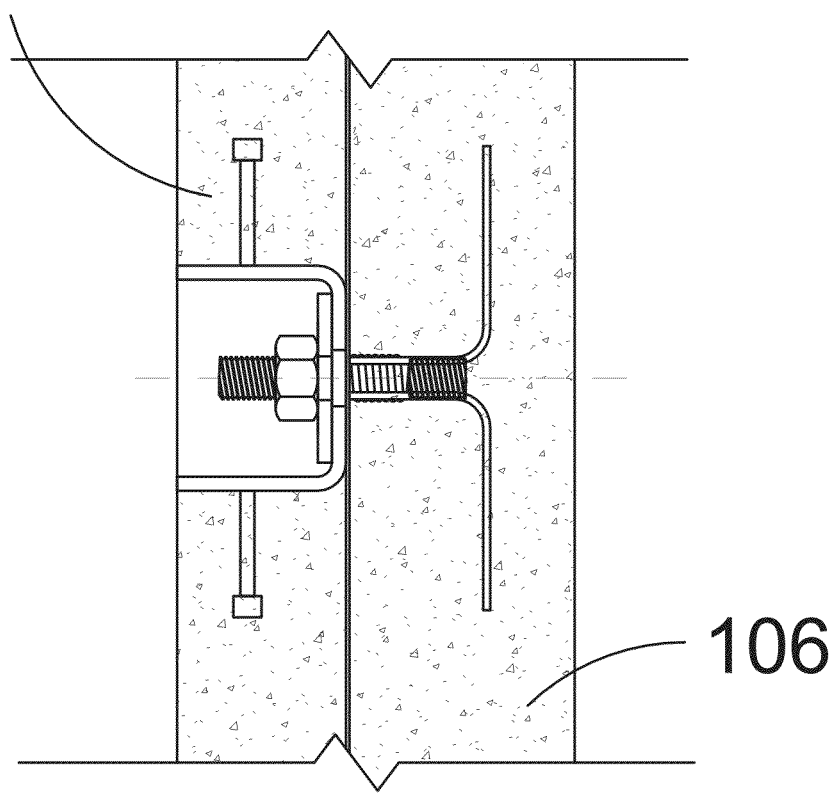
FIG. 15 is a cross-sectional view of the coupler shown in FIG. 14.

FIGS. 11 through 15 illustrate various types of coupling mechanisms that can be utilized to couple the panels 108 to the columns 106. In some embodiments, two types of couplers, type A and type B, are utilized to facilitate a fast and secure installation process. More specifically, type A coupler, as depicted in FIGS. 12 and 13, may include a hook 112 anchored in the panel 108 and a support 114 anchored in the column 106. It is contemplated that one or more type A couplers may be utilized to enable fast positioning and proper alignment of the panel 108 against the columns 106. Once the panel 108 is hooked onto the columns 106, one or more type B couplers (as depicted in FIGS. 14 and 15) may be utilized to add connection capacity between the panel 108 and the columns 106 as needed.

Figure 16:
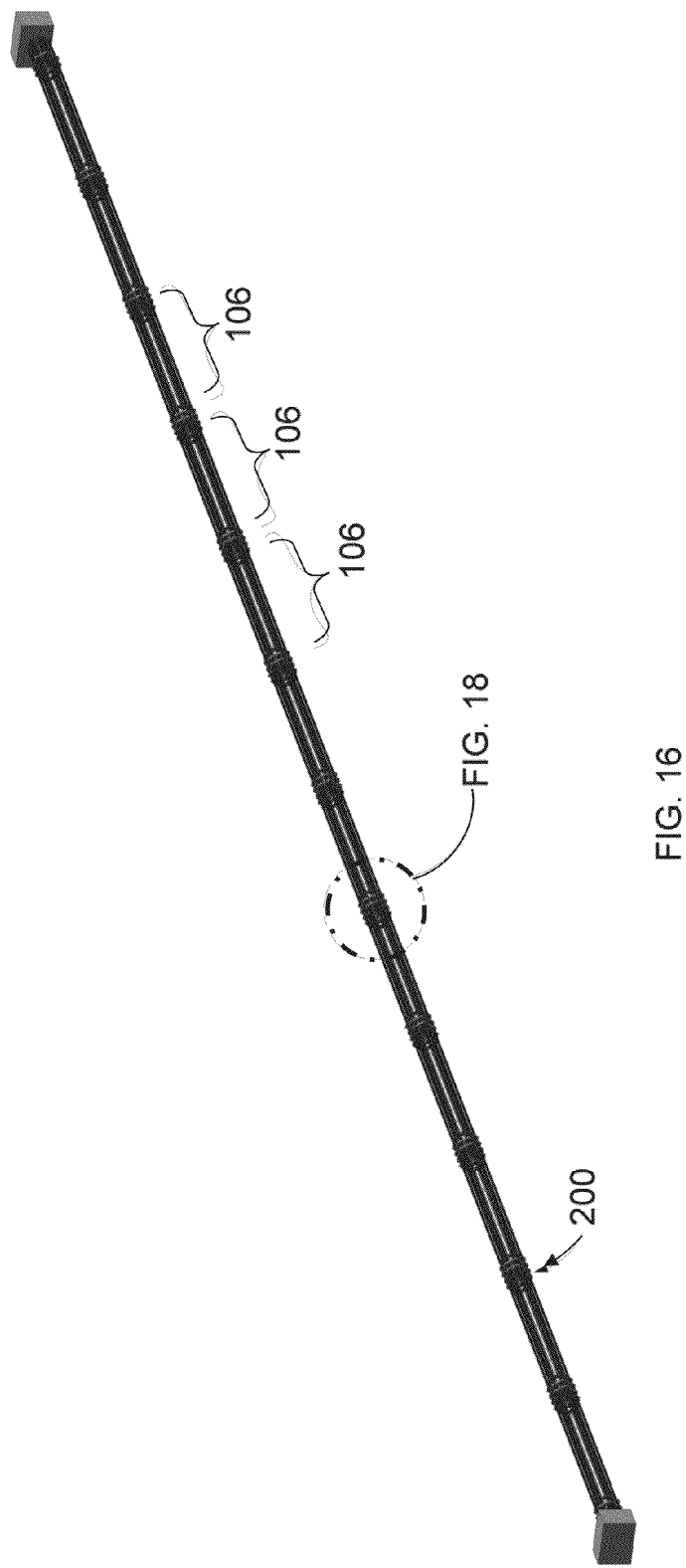
FIG. 16 is an isometric view of a fabrication device for fabricating a plurality of prestressed columns.
Figure 17:
FIG. 17 is a side elevation view of the fabrication device shown in FIG. 16.
Figure 18:
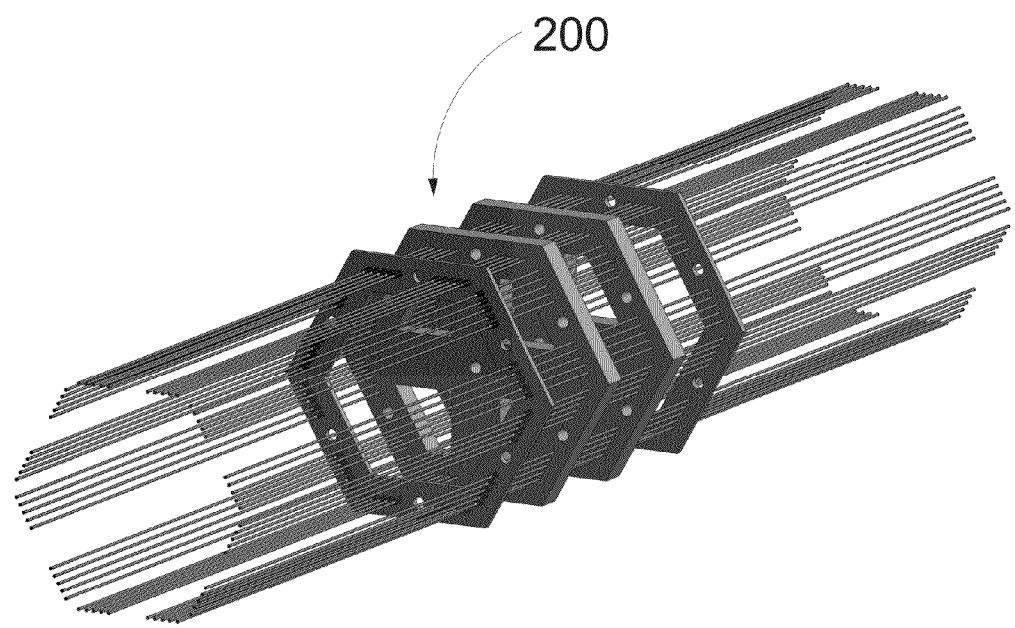
FIG. 18 is an isometric view of a tool assembly shown in FIG. 16.
Figure 19:
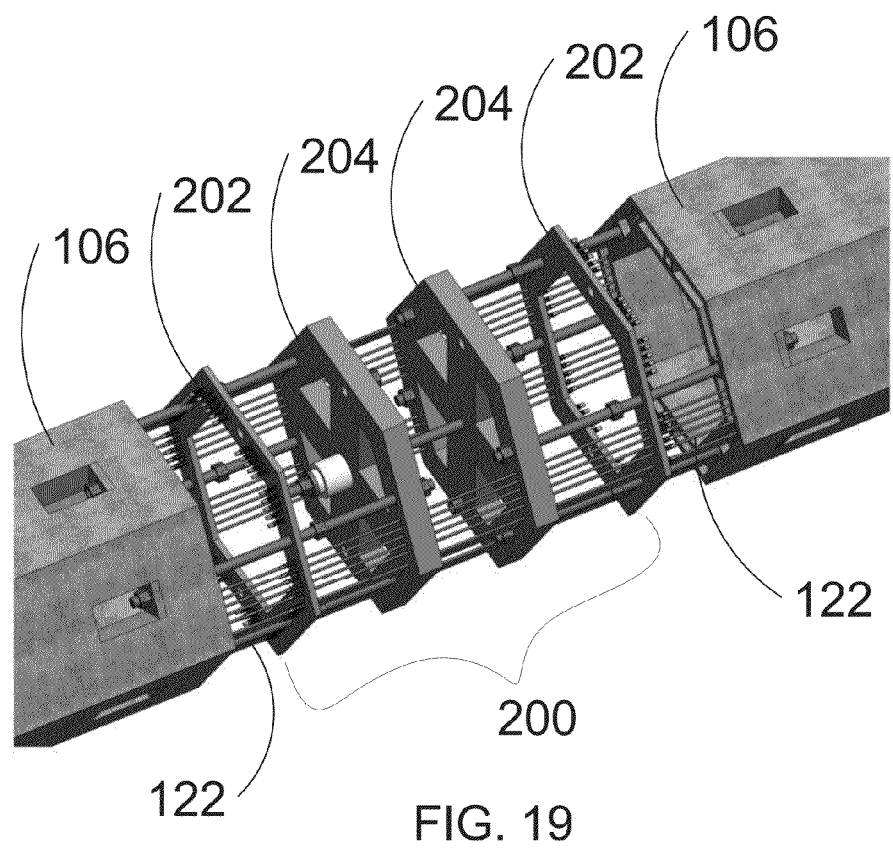
FIG. 19 is an isometric view of the tool assembly during a first stage of a fabrication process.
Figure 20:
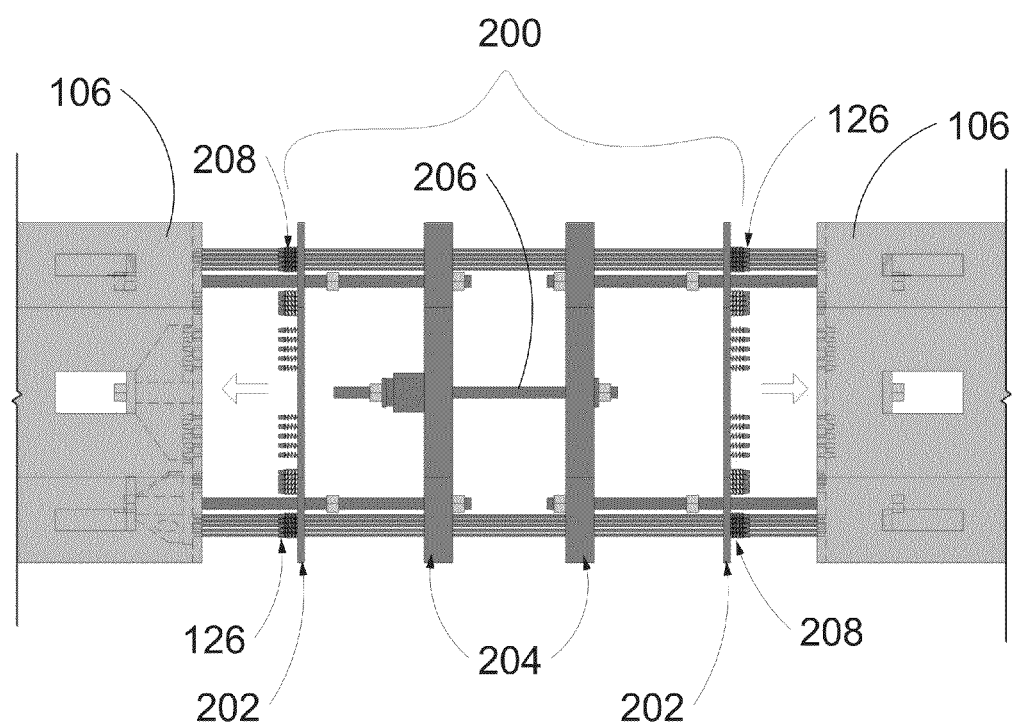
FIG. 20 is a side elevation view of the tool assembly during the first stage of the fabrication process.

Referring now to FIGS. 16 through 22, illustrations depicting an exemplary fabrication process for fabricating the columns 106 are shown. FIGS. 16 and 17 are illustrations showing pretensioning strands positioned for fabricating twelve identical prestressed columns 106. FIG. 18 is an illustration showing a more detailed view of a tool assembly 200 utilized to seat the strands at the end of each column 106. This process is further illustrated in FIGS. 19 through 22.

Figure 21:
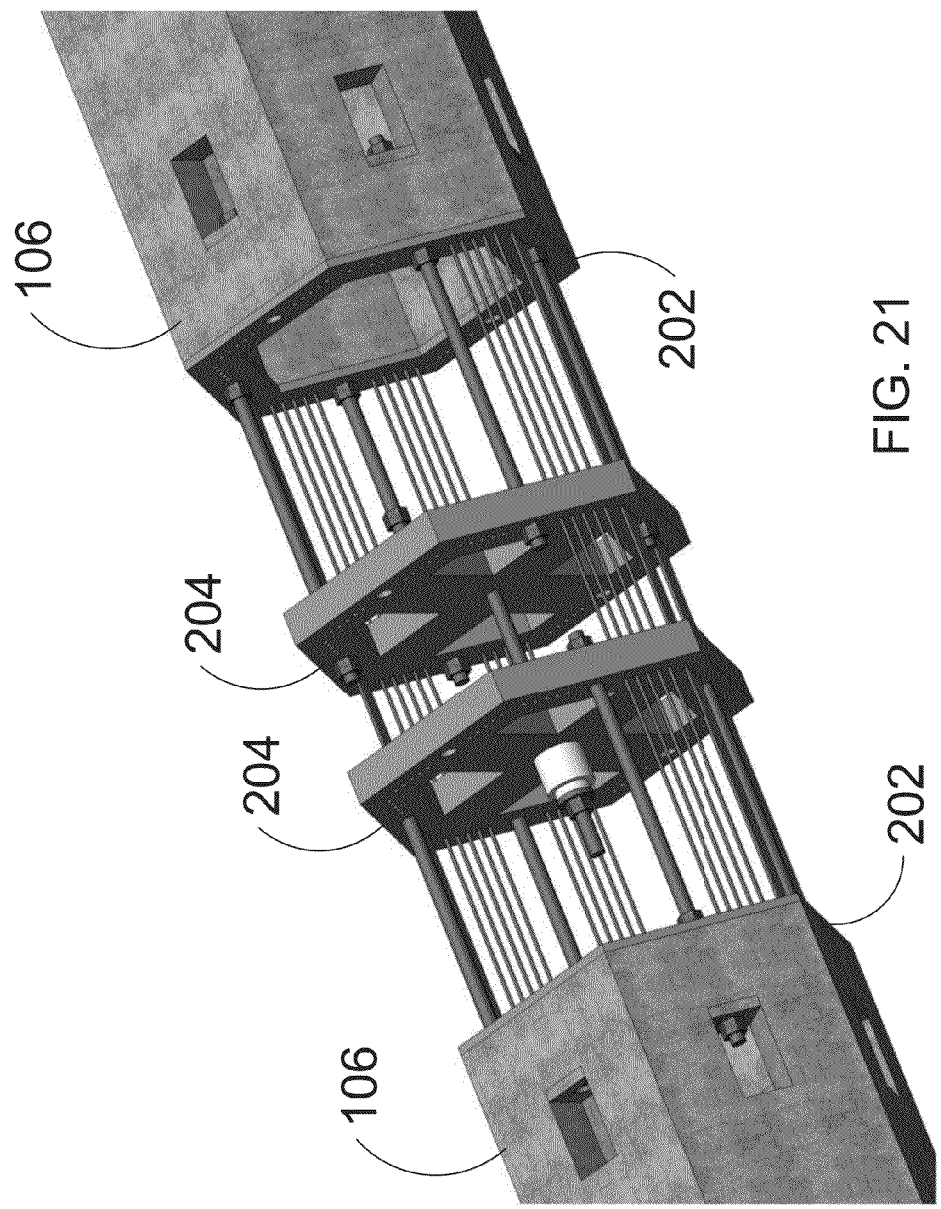
FIG. 21 is an isometric view of the tool assembly during a second stage of the fabrication process.
Figure 22:
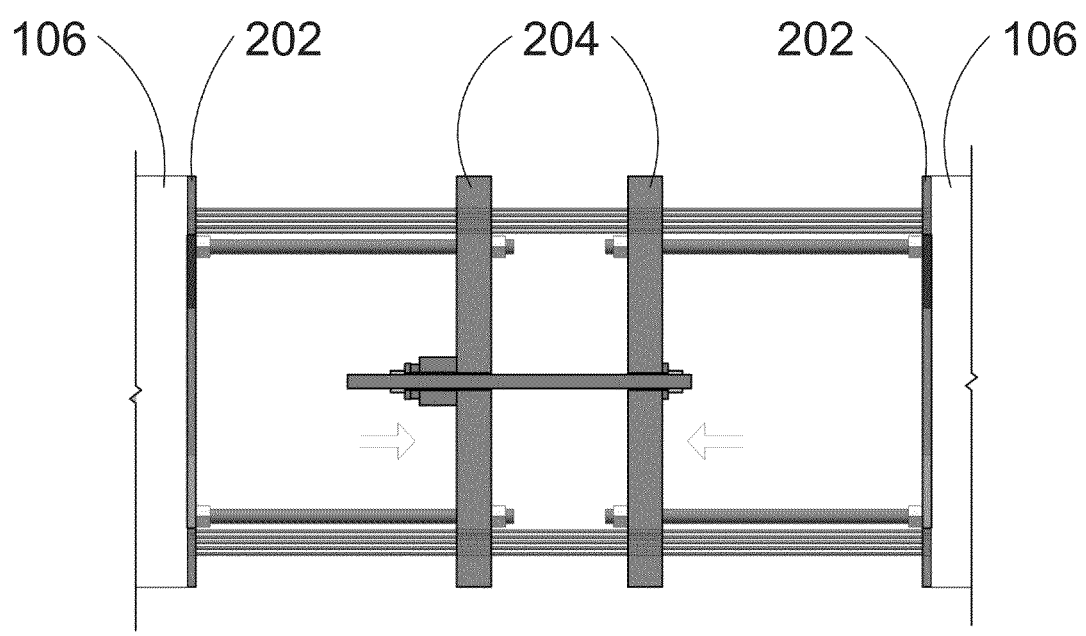
FIG. 22 is a side elevation view of the tool assembly during the second stage of the fabrication process.

As depicted in FIGS. 19 through 22, the tool assembly 200 is utilized to seat strand anchorage wedges 126 in order to minimize anchor set losses. More specifically, after the strands 122 are tensioned, a first set of plate assemblies 202 may be moved toward their corresponding columns 106 to provide initial placement and seating of the wedges 126. Subsequently, as depicted in FIGS. 21 and 22, a second set of plate assemblies 204 mechanically coupled to the first set of plate assemblies 202 may be pulled toward each other by a predetermined force (e.g., using a threaded rod 206 or the like). The predetermined force may be about 10 percent of the total prestressing force, which may be sufficient to further compress the springs 208 and may seat to the wedges 126 so that no further slippage may occur. Subsequently, after the concrete reaches the required strength, the strands 122 may be detensioned at the ends, cut and grinded. The fabricated columns 106 may then be removed and the tool assembly 200 may be reused for the next production cycle. There is an option to tension discontinuous strands at the space between column segments, utilizing the coupling techniques given in this disclosure. This option may be used without deviation from the spirit of the disclosure.

Figure 23:
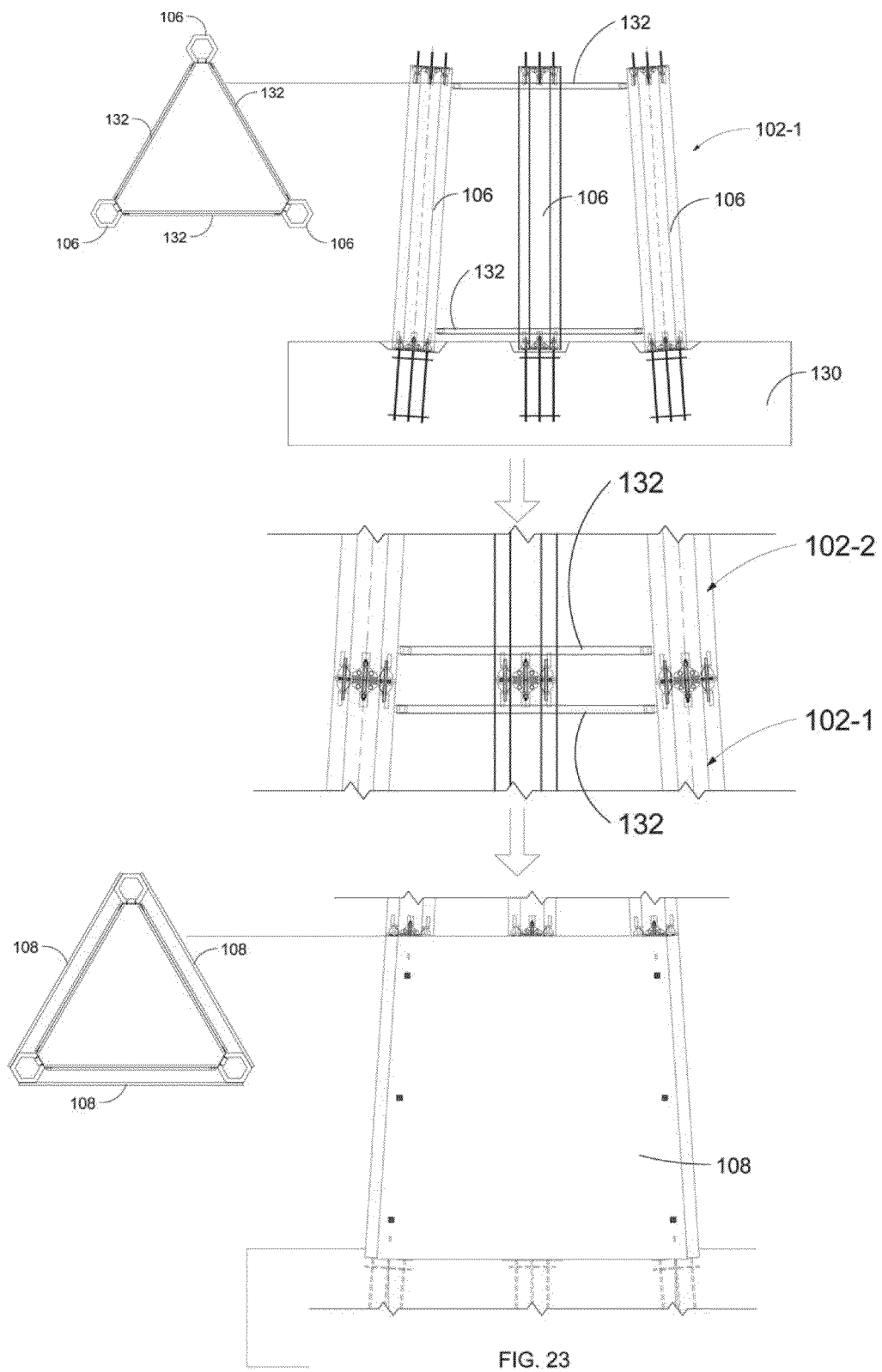
FIG. 23 is a flow diagram depicting a method for constructing a tower utilizing columns and panels in accordance with the present disclosure.

Referring now to FIG. 23, a flow diagram depicting a method for constructing a tower utilizing the columns 106 and the panels 108 in accordance with the present disclosure is shown. Construction may start with a cast-in-place concrete foundation 130, which is provided with the hardware needed to secure the three columns 106 of the bottom most (i.e., first) modular unit 102-1. In one embodiment, triangular bracing frames 132 may be utilized to provide further support for the columns 106 near the top end of the first modular unit 102-1.

With the columns 106 of the first modular unit 102-1 secured, columns 106 of the second modular unit 102-2 may then be connected to the columns 106 of the first modular unit 102-1 using column-to-column coupling mechanisms previously described. In one embodiment, the coupling mechanism may utilize 2½" diameter, grade 150 ksi steel threaded rods. It is contemplated, however, that the specific configuration may vary without departing from the spirit and scope of the present disclosure. It is contemplated that the same triangular bracing frames 132 may also be utilized to provide support for the tops of the columns 106 of the second modular unit 102-2, before the panels are installed for that modular unit.

The panels 108 may be installed once the columns 106 are secured. As previously described, the panels 108 may be hung on the corresponding columns 106 using hooks and then bolted to the columns 106 at additional edge points as needed. In some embodiments, the installation of the panels 108 may commence as soon as the columns 106 of the first modular unit 102-1 are secured. This allows for the installation of the panels 108 of the modular unit 102-1 to be performed concurrently with the installation of the columns of the second modular unit 102-2, effectively reducing the total time needed to construct the tower 100. This process may repeat until the top most (i.e., last) modular unit is fully installed.

It is to be understood that while the examples illustrated in the present disclosure referenced certain specific dimensions, sizes, shapes and hardware configurations, such references are merely exemplary. For instance, the sizes of the precast pieces (e.g., columns and/or panels) may vary based on the size of the tower. The sizes may also vary based on limits posed by the lifting mechanism(s) provided at the construction site. For example, by not exceeding the limit posed by a crane utilized to lift the wind turbine, no additional lifting capacity is required and lifting mechanism(s) readily available at the construction site can be utilized to facilitate tower construction. If a larger crane is available, the sizes of precast pieces may be increased, resulting in fewer pieces and faster erection. On the other hand, if a relatively low capacity crane must be used, the height of the modular units may be made shorter to accommodate the weight capacity of the available crane.

To reiterate, constructing a tower in accordance with the present disclosure provides several advantages. Because the precast pieces can be produced at the construction site, considerable savings can be achieved in shipping and handling. In addition, using prestressed columns offers considerable advantages compared to conventional non-prestressed columns. Utilizing the prestressed columns as described herein allows post-tensioning, which is a major complicating step, to be eliminated. It is contemplated that addition benefits of using the construction systems and methods disclosed herein may be recognized without departing from the spirit and scope of the present disclosure.

It is understood that the specific order or hierarchy of steps in the methods disclosed are examples of exemplary approaches. Based upon design preferences, it is understood that the specific order or hierarchy of steps in the method can be rearranged while remaining within the disclosed subject matter.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

What is claimed is:

1. A tower, comprising:
   a plurality of vertically stackable modular units, each modular unit of the plurality of modular units comprising:
   three generally hexagonal columns; and three concrete panels coupled to the three hexagonal columns, wherein the three concrete panels and the three hexagonal columns jointly form a equilateral triangular prism; wherein the modular units are vertically stacked to form the tower without post-tensioning.

2. The tower of claim 1, wherein each of the three generally hexagonal columns is a prestressed concrete column.

3. The tower of claim 2, wherein a substantially same level of prestress is applied to each of the three generally hexagonal columns in each of the plurality of modular units of the tower.

4. The tower of claim 1, wherein the concrete panels are conventionally reinforced concrete panels.

5. The tower of claim 1, further comprising:
   a cast-in-place foundation for securing the three generally hexagonal columns of a first modular unit of the plurality of modular units.

6. The tower of claim 5, wherein the tower is configured to support a wind turbine.

7. A method, comprising:
   constructing a tower by vertically stacking and securing a plurality of modular units, wherein each modular unit of the plurality of modular units includes: three hexagonal columns; and three concrete panels coupled to the three hexagonal columns, wherein the three concrete panels and the three hexagonal columns jointly form a generally equilateral triangular prism; wherein the modular units are vertically stacked to form the tower without post-tensioning.

8. The method of claim 7, wherein each of the three generally hexagonal columns is a prestressed concrete column.

9. The method of claim 8, wherein a substantially same level of prestress is applied to each of the three generally hexagonal columns in each of the plurality of modular units of the tower.

10. The method of claim 7, wherein the concrete panels are conventionally reinforced concrete panels.

11. The method of claim 7, wherein the generally hexagonal columns and the concrete panels are fabricated at a construction site in proximity to the tower.

12. The method of claim 7, further comprising:
    casting a foundation for securing the generally hexagonal columns of a first modular unit of the plurality of modular units.

13. The method of claim 12, further comprising:
    securing the generally hexagonal columns of the first modular unit to the foundation; and
    stacking and securing additional generally hexagonal columns of an additional modular unit on top of the generally hexagonal columns of the first modular unit.

14. The method of claim 13, further comprising:
    coupling the concrete panels to corresponding generally hexagonal columns of each modular unit.

15. The method of claim 14, wherein the concrete panels of a lower level modular unit are being coupled concurrently as the generally hexagonal columns of an upper level modular unit are being secured.

16. A modular unit for building a wind tower, the modular unit comprising: three hexagonal columns; and three concrete panels coupled to the three hexagonal columns, wherein the three concrete panels and the three generally hexagonal columns jointly form a equilateral triangular prism; wherein the modular units are vertically stacked to form the tower without post-tensioning.

17. The modular unit of claim 16, wherein the three generally hexagonal columns are prestressed concrete columns.

18. The modular unit of claim 16, wherein the three concrete panels are conventionally reinforced concrete panels.

* * * * *